May 5, 1970 F. W. WEBER 3,510,784

CONVERTIBLE TIMING CIRCUIT

Filed Aug. 1, 1966 2 Sheets-Sheet 1

INVENTOR.
FRANK W. WEBER

BY

Christie, Parker & Hale
ATTORNEYS

May 5, 1970 F. W. WEBER 3,510,784

CONVERTIBLE TIMING CIRCUIT

Filed Aug. 1, 1966 2 Sheets-Sheet 2

United States Patent Office 3,510,784

Patented May 5, 1970

3,510,784

CONVERTIBLE TIMING CIRCUIT

Frank W. Weber, Duarte, Calif., assignor to Burroughs Corporation, Detroit, Mich., a corporation of Michigan Filed Aug. 1, 1966, Ser. No. 569,124

Int. Cl. H03k 19/28

U.S. Cl. 328—63 8 Claims

ABSTRACT OF THE DISCLOSURE

A bistable device having first and second stable states and a holdover circuit for generating a holdover indication a predetermined time duration after the bistable device changes from the first state to the second state. In response to the holdover indication, the bistable device is reset into the first state. The circuitry has an input permitting the direct application of delay pulses to the holdover circuit. In the absence of delay pulses, the arrangement operates in a multivibrator mode. In the presence of delay pulses, the arrangement operates in a holdover mode. Synchronous or asynchronous operation can be selected by energizing one of two other inputs.

This invention relates to digital circuits and, more particularly, to a digital timing circuit.

One well-known timing circuit employed in digital systems, such as computers, is the monostable multivibrator, which generates a signal timed from the beginning of a trigger pulse. Thus, pulses are generated that last a fixed time duration after the start of their respective trigger pulses. A correlative timing circuit is the so-called holdover circuit, an example of which is disclosed in my Pat. 3,132,261, issued May 5, 1964. A holdover circuit generates a signal timed from the end of a trigger pulse. Thus, pulses are generated that last a fixed time duration after the finish of their respective trigger pulses; i.e., a duration equal to the sum of the duration of the trigger pulse and the fixed duration.

Sometimes it is desired to employ monostable multivibrators and holdover circuits in different parts of the same digital system. Moreover, in some parts of this digital system the operations may require synchronization of the timing circuits to a source of clock pulses, while in other parts of the system, operation may be executed asynchronously. By employing a single timing circuit that is convertible to allow operation in different modes, the original costs associated with development and production can be spread over a larger number of units, and it is possible to employ the same unit as a replacement part for several different types of timing circuits. As a consequence of the latter consideration, the stock on hand required for maintenance of the digital system is reduced. If the timing circuit is laid out on a circuit board, for example, the same circuit board could be plugged into different connector slots, the external wiring of which converts the timing circuit into one mode of operation or another.

It is at times also desirable to be able to convert a single timing circuit in a digital system to operate in different modes of operation at different times, depending upon the operation being performed.

According to the invention, a timing circuit is provided that can be conveniently converted to operate in different modes of operation by changing the digital inputs applied to it. The timing circuit comprises a bistable device having first and second stable states and a holdover circuit for generating a holdover indication a predetermined time duration after the bistable device changes from the first state to the second state. In response to the holdover indication the bistable device is reset into the first state.

To operate the convertible timing circuit in a monostable multivibrator mode, trigger pulses are applied to the bistable device to set it into the second state, which is maintained until the holdover circuit generates an indication resetting the bistable device. To operate the timing circuit in a holdover mode, in addition to applying trigger pulses to the bistable device to set it into the second state, delay pulses are also applied directly to the holdover circuit. As a result, the holdover indication is delayed until the predetermined time duration after a delay pulse terminates. When the delay pulses coincide with the trigger pulses, a standard holdover mode of operation ensues. In both the monostable multivibrator and holdover modes, owing to the characteristics of the bistable device, the operation can be made either synchronous with a source of clock pulses or asynchronous. Thus, four modes of operation are possible, namely, synchronous monostable multivibrator, asynchronous monostable multivibrator, synchronous holdover, and asynchronous holdover.

These and other features of the invention are considered further in the following detailed description taken in conjunction with the drawings, in which.

Figure 1:
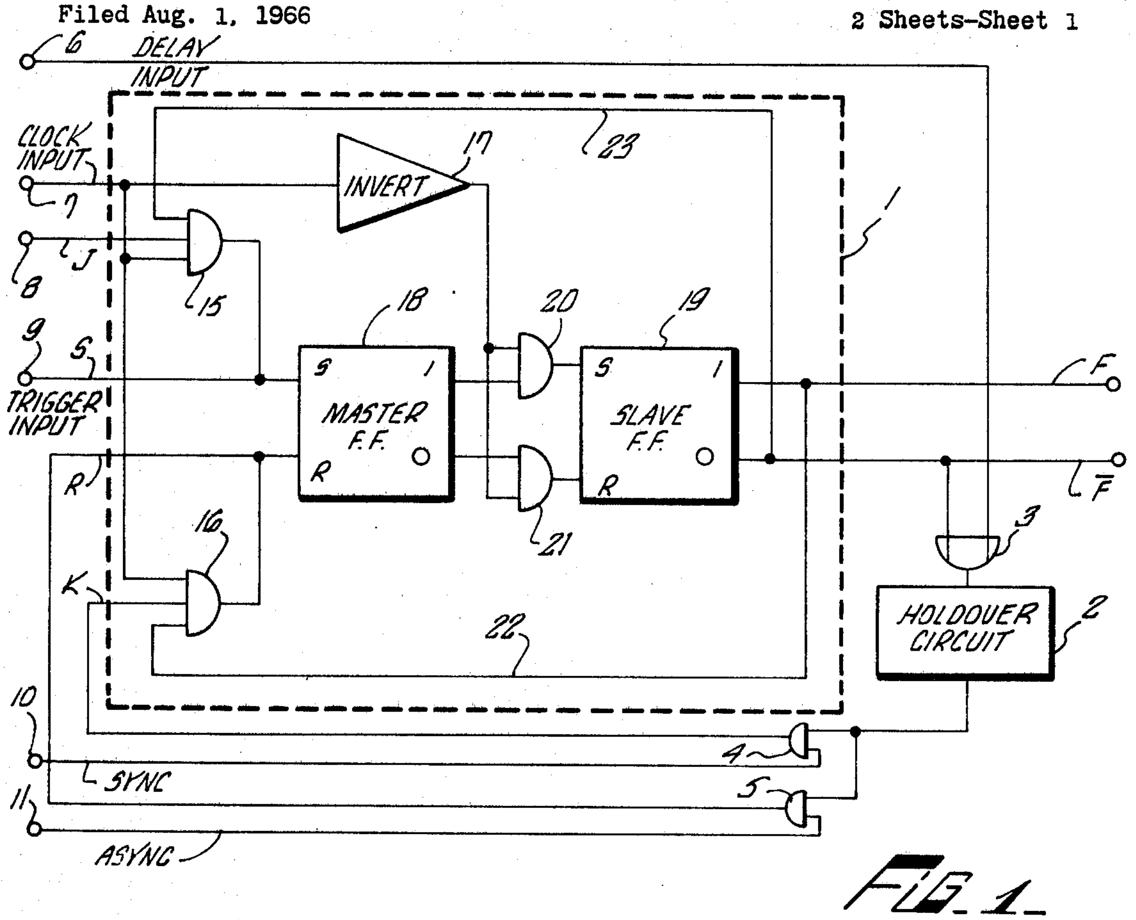
FIG. 1 is a circuit diagram in block form of a convertible timing circuit illustrating the principles of the invention.

In FIG. 1 a timing circuit is shown comprising a bistable circuit 1, a holdover circuit 2, and associated gates 3, 4, and 5. These components could, for example, be laid out on a circuit board having connector elements represented by terminals 6, 7, 8, 9, 10, and 11. As explained further below, the timing circuit of FIG. 1 can be converted from one mode of operation to another simply by controlling the digital inputs to terminals 6 through 11. Bistable device 1 functions as a so-called J–K flip-flop, input leads J and K being active, when the timing circuit operates synchronously and functions as a so-called S–R flip-flop, input leads S and R being active, when the timing circuit operates asynchronously. Trigger pulses are applied through terminals 8 and 9 to input leads J and S, of bistable device 1 respectively. When the timing circuit is operating synchronously, clock pulses are applied to bistable device 1 over input terminal 7, and operation is synchronized to the end of the clock pulses. These clock pulses are applied to one input of an AND gate 15, one input of an AND gate 16, and the input of an inverter 17. As part of bistable device 1 a flip-flop 18 and a flip-flop 19 operate in a master-slave relationship. The output terminals of flip-flop 18 are connected to one input of AND gates 20 and 21, respectively, while the output of inverter 17 is applied to the other input of AND gates 20 and 21, respectively. The "1" output lead of flip-flop 19, which also constitutes an output lead F of bistable device 1, is connected to one input of AND gate 16 by a lead 22 and the "0" output of flip-flop 19, which also constitutes an output lead $\overline{F}$ of bistable device 1, is connected to one input of AND gate 15 by a lead 23. On the application of a trigger pulse to lead J the state of flip-flop 18 is only changed if output lead $\overline{F}$ is already in a "1" state. Similarly, the state of flip-flop 18 is only changed on the application of a trigger pulse to lead K, if output lead F is already in a "1" state. If trigger pulses are applied to leads J and K simultaneously, the state of flip-flop 18 is changed, regardless of whether output lead F or $\overline{F}$ is in a "1" state. Changes of state of flip-flop 18 occur near the beginning of the clock pulses. At the end of the respective clock pulses, AND gate 20 or AND gate 21 transmits this change of state to flip-flop 19 which then also changes state. By use of a master-slave arrangement, the changes in state of flip-flop 19 are synchronized to the end of the clock pulses.

When the timing circuit is operating asynchronously, no clock pulses are applied to terminal 7. Trigger pulses applied to lead S or R cause a change of state of flip-flop 18 immediately. This change of state is immediately transmitted through AND gate 20 or AND gate 21 to one of the input leads of flip-flop 19, which also immediately changes state.

If the input of holdover circuit 2 has been in an "0" state for a longer time than its holdever delay, its output is in a "1" state. If the input of holdover circuit 2 thereafter assumes a "1" state for a time period T, the output of holdover circuit 2 assumes a "0" state, which is retained until a predetermined holdover period $T_p$ after the input returns to a "0" state.

Figure 2:
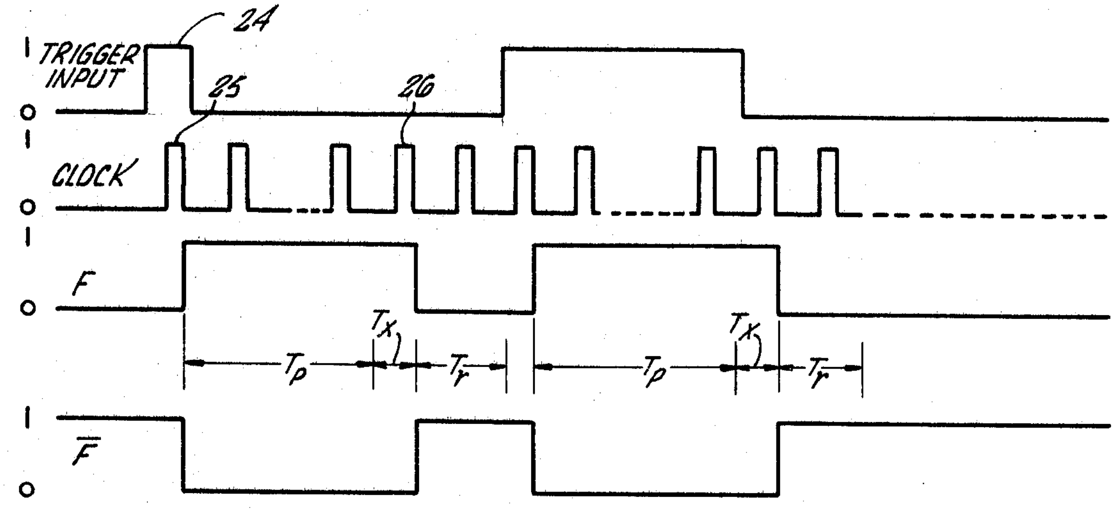
FIG. 2 is a diagram of waveforms illustrating the operation of the timing circuit of FIG. 1 in a synchronous monostable multivibrator mode.

When the timing circuit of FIG. 1 is operating in the synchronous, monostable multivibrator mode, clock pulses are applied to terminal 7, trigger pulses are applied to terminal 8, and a continuous signal having a "1" value is applied to terminal 10. As a result of the continuous signal applied to terminal 10, AND gate 4 closes a feedback path from the output of holdover circuit 2 to lead K. Assuming that the complementary outputs of bistable device 1. F and $\overline{F}$, are in a "0" and a "1" state, respectively, and a trigger pulse 24 is present at terminal 8, as shown in FIG. 2, bistable device 1 changes state at the end of clock pulse 25. Before bistable device 1 changes state, output terminal $\overline{F}$, which is connected to the input of holdover circuit 2, is in a "1" state and the output of holdover circuit 2 is in a "0" state. Upon the change of state of bistable device 1, output terminal $\overline{F}$ assumes a "0" state and holdover circuit 2 begins to time out its holdover delay, its output remaining in a "0" state until holdover delay time $T_p$ elapses. At this point, the output of holdover circuit 2 assumes a "1" state. This signal is transmitted through AND gate 4 to input terminal K of bistable device 1 and serves as a trigger pulse to change the state of bistable device 1 at the end of a clock pulse 26. Then, the output of holdover circuit 2 assumes a "0" state again. After the elapse of a reset period $T_r$, this cycle is repeated each time a trigger pulse is applied to terminal 8. Each pulse generated by bistable device 1 has a pulse length equal to the sum of the time delay $T_p$ of holdover circuit 2 plus the time interval $T_x$ thereafter until the next clock pulse appears. For ordinary operation, the trigger pulses are separated in time by an interval larger than the sum of $T_p$ and $T_x$ and $T_r$.

Figure 3:
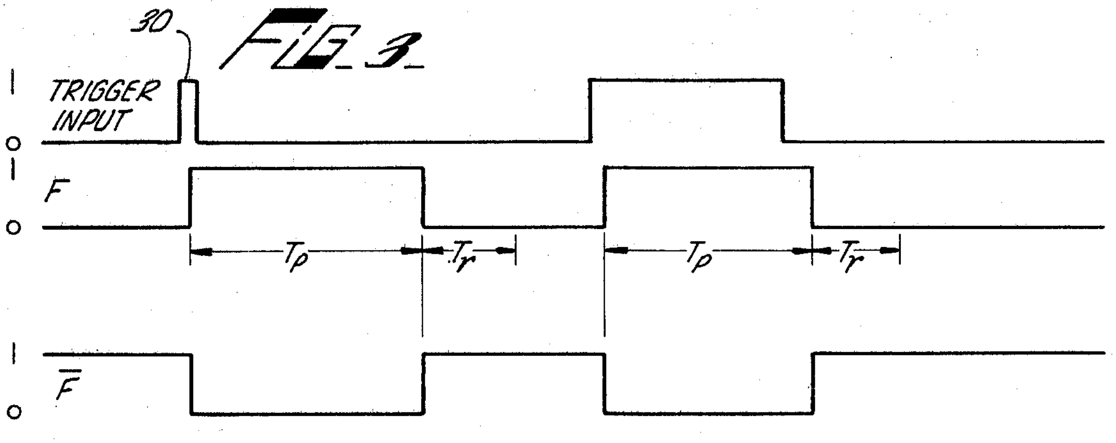
FIG. 3 is a diagram of waveforms illustrating the operation of the timing circuit of FIG. 1 in an asynchronous monostable multivibrator mode.

When the timing circuit of FIG. 1 operates in the asynchronous, monostable multivibrator mode the cycle is similar. In this mode a continuous signal having a "1" value is applied to AND gate 5 over terminal 11, to close a feedback path from the output of holdover circuit 2 to lead R of bistable device 1. As illustrated in FIG. 3, bistable device 1 changes state immediately upon application of a trigger pulse 30 to terminal 9 and remains in this state until holdover circuit 2 times out its delay $T_p$, at which time bistable device 1 returns immediately to its initial state.

Figure 4:
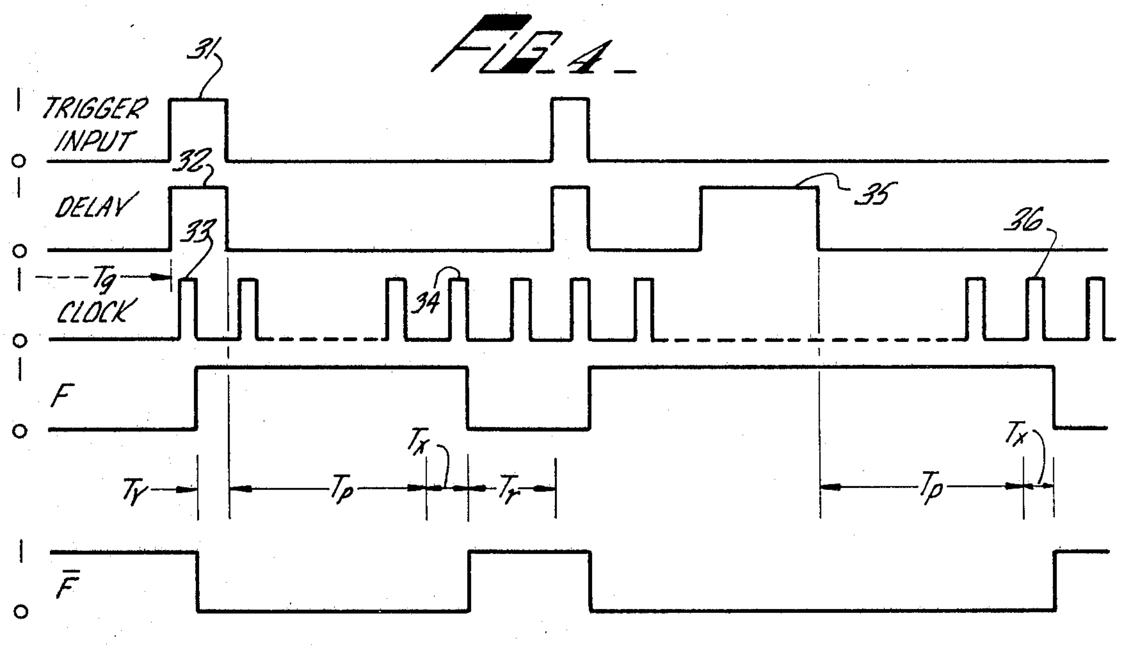
FIG. 4 is a diagram of waveforms illustrating the operation of the timing circuit of FIG. 1 in a synchronous holdover mode.

When the timing circuit of FIG. 1 is operating in the synchronous, holdover mode, clock pulses are applied to terminal 7, trigger pulses are applied to terminal 8, a continuous signal having a "1" value is applied to terminal 10, and delay pulses are applied to terminal 6. As in the synchronous, monostable multivibrator mode of operation, bistable device 1 changes state upon the simultaneous appearance of a clock pulse and a trigger pulse. By applying delay pulses to the input of holdover circuit 2 through OR gate 3, however, the beginning of time interval $T_p$ is delayed until the end of the delay pulse, because the input to holdover circuit 2 is in a "1" state. This is illustrated in FIG. 4, where a trigger pulse 31 and a delay pulse 32 occur simultaneously. Bistable device 1 changes state at the end of a clock pulse 33, but holdover circuit 2 does not start to time out for a time interval $T_y$, when delay pulse 32 ends. Then holdover circuit 2 generates a trigger pulse after a delay of a time $T_p$. By use of delay pulses spaced closer together than holdover delay $T_p$, such as delay pulse 35, holdover circuit 2 begins to time out anew from the end of the last delay pulse.

Figure 5:
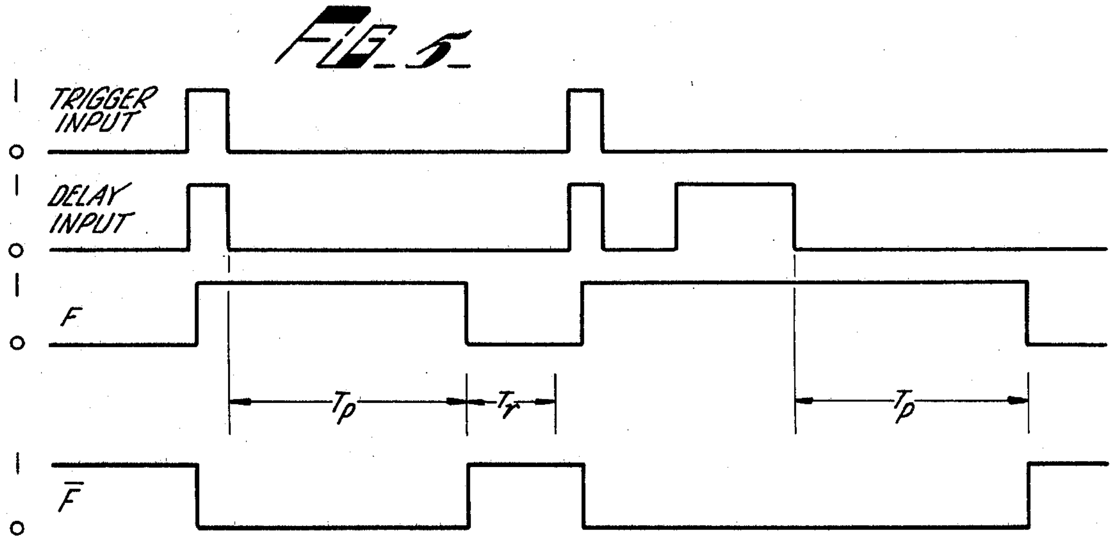
FIG. 5 is a diagram of waveforms illustrating the operation of the timing circuit of FIG. 1 in an asynchronous holdover mode.

In the asynchronous holdover mode, as illustrated in FIG. 5, bistable device 1 changes state immediately upon application of a trigger pulse to terminal 9 and returns to its initial state immediately after time interval $T_p$ elapses. But holdover circuit 2 is controlled by the delay pulses applied to terminal 6. In this mode a continuous signal having a "1" value is applied to the input of AND gate 5 from terminal 11. It is not necessary in the holdever mode that the delay pulses coincide with the trigger pulses or be related to them in any particular way, although a standard holdover mode of operation results when the two coincide.

What is claimed is:

1. A timing circuit comprising a bistable device having first and second stable states, means for repeatedly at intervals greater than a predetermined time interval setting the bistable device into the second state, a source of pulses for converting to a holdover mode of operation, means responsive to the bistable device and the source for generating a holdover indication the predetermined time interval after the occurrence of the latter of the following two events—the change of the bistable device from the first state to the second state and the end of a pulse from the source that appears in the predetermined time interval after the bistable device changes from the first state to the second state, and means responsive to the holdover indication for resetting the bistable device into the first state.

2. The timing circuit of claim 1, in which the bistable device has first and second input terminals, the device resetting into the first state when a signal is applied to the first input terminal and setting into the second stae when a signal is applied to the second input terminal, the setting means is a source of pulses applied to the second input terminal, and the returning means is a connection for applying the holdover indication to the first input terminal.

3. A timing circuit comprising a bistable device having first and second complementary output terminals, a plurality of input terminals for controlling changes in state of the output terminals, and an input terminal for accepting synchronizing clock pulses, the bistable device being capable of operating either in synchronous mode or an asynchronous mode, a holdover circuit having an output terminal in one of two states and an input terminal, the output terminal of the holdover circuit assuming one state when its input terminal assumes one state and maintaining the one state a predetermined time after its input terminal assumes the other state, means for connecting the first output terminal of the bistable device to the input terminal of the holdover circuit, and means for connecting the output terminal of the holdover circuit to one of the input terminals of the bistable device such that the bistable device changes state responsive to the holdover circuit assuming the other state after the predetermined time has elapsed.

4. The timing circuit of claim 3, in which the bistable device has a first reset input terminal operative in a synchronous mode and a second reset input terminal operative in an asynchronous mode, first and second AND gates are provided, and the means for connecting the output terminal of the holdover circuit to one of the input terminals of the bistable device is the first and second AND gates, the output of the holdover circuit being connected to one input of each of the AND gates, a synchronous mode input terminal being connected to the other input of the first AND gate, and an asynchronous mode input terminal being connected to the other input of the second AND gate, the output of the first AND gate being connected to the synchronous mode reset input terminal of the bistable device, and the output of the second AND gate being connected to the asynchronous mode reset terminal of the bistable device.

5. The timing circuit of claim 4, in which a source of synchronizing clock pulses is applied to the clock pulse input terminal of the bistable device and a continuous signal is applied to the synchronous mode input terminal so as to enable the first AND gate.

6. The timing circuit of claim 4, in which a continuous signal is applied to the asynchronous mode input terminal so as to enable the second AND gate and another input terminal is adapted to accept trigger pulses that change the state of the bistable device such that its first output terminal assumes the one state.

7. A timing circuit comprising a bistable device having first and second complementary output terminals and a plurality of input terminals for controlling changes in state of the output terminals, a holdover circuit having an output terminal in one of two states and an input terminal the output terminal of the holdover circuit assuming one state when its input terminal assumes one state and maintaining the one state a predetermined time after its input terminal assumes the other state, a source of delay pulses assuming one of two states, an OR gate having one input to which the first output terminal of the bistable device is connected and another input to which the source of delay pulses is connected, means for connecting the output of the OR gate to the input terminal of the holdover circuit such that the input terminal of the holdover circuit assumes the one state when either the first output terminal of the bistable device or the source of delay pulses assumes the one state, the input terminal of the holdover circuit otherwise assuming the other state, and means for connecting the output terminal of the holdover circuit to one of the input terminals of the bistable device such that the bistable device changes state responsive to the holdover circuit assuming the other state after the predetermined time has elapsed.

8. A timing circuit comprising a bistable device having first and second complementary output terminals and a plurality of input terminals for controlling changes in state of the output terminals, a first input terminal of the bistable device being adapted to accept trigger pulses that change the state of the bistable device such that its first output terminal assumes the one state and a second input terminal of the bistable device being adapted to accept reset pulses that change the state of the bistable device such that its first output terminal assumes the other state, a source of trigger pulses coupled to the first input terminal of the bistable device, a holdover circuit having an output terminal in one of two states and an input terminal, the output terminal of the holdover circuit assuming one state when its input terminal assumes the one state and maintaining the one state a predetermined time after its input terminal assumes the other state, means for connecting the first output terminal of the bistable device to the input terminal of the holdover circuit, and means for connecting the output terminal of the holdover circuit to the second input terminal of the bistable device such that the bistable device changes state responsive to the holdover circuit assuming the other state after the predetermined time has elapsed, the change in state at the output terminal of the holdover circuit serving as a reset pulse that causes the first output terminal of the bistable device to assume the one state.

References Cited

UNITED STATES PATENTS

| | | | |
|---|---|---|---|
| 3,297,883 | 1/1967 | Schulmeyer et al. ---- | 307—228 |
| 3,331,032 | 7/1967 | Miller -------------- | 307—207 |

DONALD D. FORRER, Primary Examiner

B. P. DAVIS, Assistant Examiner

U.S. Cl. X.R.

307—208, 269; 308—196